United States Patent
Kondo et al.

(10) Patent No.: US 9,266,185 B2
(45) Date of Patent: Feb. 23, 2016

(54) TANDEM WELDING TORCH

(71) Applicant: Kobe Steel, Ltd., Kobe-shi (JP)

(72) Inventors: Makoto Kondo, Fujisawa (JP); Tatsuji Minato, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 497 days.

(21) Appl. No.: 13/788,080

(22) Filed: Mar. 7, 2013

(65) Prior Publication Data

US 2013/0256291 A1  Oct. 3, 2013

(30) Foreign Application Priority Data

Mar. 28, 2012  (JP) ................. 2012-075216

(51) Int. Cl.
  *B23K 9/32*  (2006.01)
  *B23K 9/173*  (2006.01)

(52) U.S. Cl.
  CPC ............... *B23K 9/32* (2013.01); *B23K 9/1735* (2013.01)

(58) Field of Classification Search
  USPC ............................ 219/138, 74, 75
  See application file for complete search history.

(56) References Cited

U.S. PATENT DOCUMENTS

| | | | | |
|---|---|---|---|---|
| 1,362,491 A * | 12/1920 | Kenyon | ................. | B23K 9/125 314/103 |
| 2,756,311 A * | 7/1956 | Persson | ................. | B23K 9/0737 219/123 |
| 5,155,330 A * | 10/1992 | Fratiello | ................. | B23K 9/295 219/137 R |
| 6,172,333 B1 * | 1/2001 | Stava | ................. | B23K 9/1735 219/130.1 |
| D636,803 S * | 4/2011 | Nakagiri | ................. | D15/199 |
| 2005/0173379 A1 * | 8/2005 | Ireland | ................. | B23K 9/293 219/75 |
| 2005/0199593 A1 * | 9/2005 | Ignatchenko | ................. | B23K 9/173 219/121.45 |
| 2007/0017910 A1 | 1/2007 | Takeshita et al. | | |
| 2007/0145028 A1 * | 6/2007 | Artelsmair | ................. | B23K 9/1675 219/137.71 |
| 2007/0284351 A1 * | 12/2007 | Diez | ................. | B23K 9/122 219/137 R |
| 2008/0053978 A1 * | 3/2008 | Peters | ................. | B23K 9/025 219/130.5 |
| 2008/0128400 A1 * | 6/2008 | Michels | ................. | B23K 11/318 219/148 |
| 2009/0039066 A1 * | 2/2009 | Centner | ................. | B23K 9/1735 219/137.31 |

(Continued)

FOREIGN PATENT DOCUMENTS

| | | |
|---|---|---|
| JP | 2004-351510 A | 12/2004 |
| JP | 2005-324250 A | 11/2005 |
| JP | 2009-34746 A | 2/2009 |

*Primary Examiner* — Dana Ross
*Assistant Examiner* — Renee L Miller
(74) *Attorney, Agent, or Firm* — Oblon, McClelland, Maier & Neustadt, L.L.P.

(57) ABSTRACT

A shock sensor unit includes first and second sensor shafts having bulging portions, first and second positioning pins in contact with the bulging portions, first and second spring members that press the first and second sensor shafts, first and second sensor bodies that contain the first and second positioning pins movably, and first and second detectors that detect movements of first and second spring guides. Each of the first and second positioning pins is located at two positions that are point-symmetrical with respect to a center point between first and second electrodes.

5 Claims, 9 Drawing Sheets

(56) References Cited

U.S. PATENT DOCUMENTS

| | | | | |
|---|---|---|---|---|
| 2009/0236320 | A1* | 9/2009 | Enatsu | B23K 9/1735 219/74 |
| 2009/0294428 | A1* | 12/2009 | Yoshima | B23K 9/067 219/137 R |
| 2009/0308855 | A1* | 12/2009 | Yoshima | B23K 9/1735 219/125.1 |
| 2010/0320174 | A1* | 12/2010 | Hybinette | B23K 9/0284 219/74 |
| 2011/0062130 | A1* | 3/2011 | Barker | B23K 9/32 219/130.1 |
| 2011/0108536 | A1* | 5/2011 | Inada | B23K 9/0953 219/130.1 |
| 2011/0198320 | A1* | 8/2011 | Mather | B23K 9/013 219/121.48 |
| 2011/0278272 | A1* | 11/2011 | Fukunaga | B23K 9/0216 219/130.01 |
| 2011/0290771 | A1* | 12/2011 | Fukunaga | B23K 9/126 219/130.1 |
| 2011/0301733 | A1* | 12/2011 | Yoshima | B23K 9/0216 700/96 |
| 2012/0061364 | A1* | 3/2012 | Purslow | B23K 9/1735 219/137.62 |
| 2012/0125905 | A1* | 5/2012 | Anzengruber | B23K 9/323 219/137.63 |
| 2013/0208569 | A1* | 8/2013 | Pfeifer | B23K 9/095 367/129 |
| 2013/0334333 | A1* | 12/2013 | Magedanz | B05B 13/0431 239/1 |
| 2015/0001184 | A1* | 1/2015 | Cole | B23K 9/08 219/75 |

* cited by examiner

TANDEM WELDING TORCH

BACKGROUND OF THE INVENTION

1. Field of the Invention

The present invention relates to a tandem welding torch including a shock sensor unit attached to a robot arm of a welding robot that performs tandem welding with two welding torches.

2. Description of the Related Art

For example, Japanese Unexamined Patent Application Publication Nos. 2004-351510 (hereinafter referred to as PTL 1, paragraph [0006], FIGS. 1 and 2) and 2009-34746 (hereinafter referred to as PTL 2, FIGS. 2 to 4) each disclose a welding torch attached to a welding robot. A typical welding torch is equipped with a shock sensor unit (shock sensor) that protects the welding torch when the welding torch collides with a foreign object such as an object to be welded or a jig.

The shock sensor unit described in PTL 1 and PTL 2 is a single-torch sensor that stops the welding robot when it detects a collision of one welding torch (nozzle) with a foreign object. The shock sensor unit is interposed between a flange joined to a hollow wrist portion of the welding robot and the welding torch.

For example, Japanese Unexamined Patent Application Publication No. 2005-324250 (hereinafter referred to as PTL 3, FIG. 4) discloses a shock sensor unit (shock sensor) attached to a tandem welding torch. The shock sensor unit is provided at a distal end of an arm of a welding robot, and two welding torches are attached to a distal end of the shock sensor unit with a bracket, a torch clamp, etc. being disposed therebetween.

In the tandem welding torch described in PTL 3, one shock sensor unit is provided at the distal end of the arm of the welding robot, a first torch and a first connector are provided at a distal end of the shock sensor unit with a bracket being disposed therebetween, and a second torch is attached to the first connector with a second connector being disposed therebetween.

However, in the welding torch and the welding robot described in PTL 1 and PTL 2, one shock sensor unit is provided along a center line of one welding torch. Even when two units, each including a single welding torch and a single shock sensor unit, are juxtaposed, they are not applicable to a tandem welding torch including two welding torches.

That is, even if two welding torches, each including a shock sensor unit, are simply juxtaposed, they separately move in a collision with a foreign object to be welded. Hence, the distance between the distal ends of the welding torches mounted in position and orientations and mount positions of the welding torches are changed, and this makes accurate welding difficult. For this reason, the welding torch described in PTL 1 and PTL 2 is not applicable to a tandem welding torch.

The shock sensor unit attached to the tandem welding torch described in PTL 3 receives the total mass of the tandem welding torch, the bracket, and a torch cable and tensile and compression loads on the torch cable produced by robot operation. For this reason, it is necessary to use a strong spring member in order to obtain a great holding force for holding the tandem welding torch.

Accordingly, the detection sensitivity of the shock sensor unit having such a structure needs to be reduced in order to prevent erroneous detection when the tensile and compression loads on the torch cable are applied.

As a result, the shock sensor unit needs to hold the welding torch with a spring force more than a proper force. Since the spring force for holding the welding torch is great, it lays a heavy burden. The shock sensor unit does not operate unless a force greater than the spring force is applied thereto when the welding torch collides with an object to be welded, and therefore, the welding torch is bent.

Further, since the sensitivity to impact is set low, the shock sensor unit delays detecting the collision of the welding torch with the object. Therefore, the welding torch is deformed by the impact, or welding wires in the welding torch are misaligned with a welding line.

When the welding wires are misaligned, welding defects, such as an undercut and incomplete penetration, occur, and this deteriorates welding quality. For this reason, it is necessary to accurately align two welding wires with the welding line.

In the tandem welding torch described in PTL 3 and the tandem welding torch including two welding torches of PTL 1 and PTL 2, power is separately supplied to the two welding torches. Hence, in the shock sensor unit, it is essential to isolate two electrodes and to isolate the arms of the welding robot. This increases the number of components and complicates the structure and assembly operation.

SUMMARY OF THE INVENTION

The present invention has been made in view of such problems, and an object of the invention is to provide a tandem welding torch including a shock sensor unit in which deformation of welding torches is prevented by releasing, through a first spring member and a second spring member, an impact applied to the welding torches when the welding torches touch or collide with a foreign object, such as an object to be welded or a jig, and an accuracy of the welding torches in returning to an original position after the impact is released is enhanced.

To overcome the above-described problems, a tandem welding torch according to an aspect of the present invention includes a torch fixing portion that fixes distal ends of two juxtaposed welding torches together, an insulation cover that protects proximal ends of the welding torches, a first torch proximal-end holding portion provided in the insulation cover to hold the proximal end of one of the welding torches, a second torch proximal-end holding portion provided in the insulation cover to hold the proximal end of the other welding torch, and a shock sensor unit that detects tilts and movements of the first torch proximal-end holding portion and the second torch proximal-end holding portion. The shock sensor unit includes a hollow first sensor shaft in which a first electrode is inserted, the first sensor shaft having a front end connected to the first torch proximal-end holding portion and a rear end having a bulging portion of an increased diameter, a hollow second sensor shaft in which a second electrode is inserted, the second sensor shaft extending in an axial direction of the first sensor shaft to be adjacent to the first sensor shaft and having a front end connected to the second torch proximal-end holding portion and a rear end having a bulging portion of an increased diameter, a first positioning pin provided in contact with an outer peripheral surface of the bulging portion of the first sensor shaft, a second positioning pin provided in contact with an outer peripheral surface of the bulging portion of the second sensor shaft, a first spring member that presses the first sensor shaft toward the distal end with a first spring guide being disposed therebetween, a second spring member provided adjacent to the first spring member to press the second sensor shaft toward the distal end with a second spring guide being disposed therebetween, a first sensor body that contains the first sensor shaft, the first positioning pin, and the first spring member movably, a second sensor body that contains the second sensor shaft, the second positioning pin, and the second spring member movably, a first detector that detects a movement in an axial direction of the first spring guide, and a second detector that detects a movement in an axial direction of the second spring guide. The first sensor body and the second sensor body are located at positions that are point-symmetrical with respect to a center point between the first electrode and the second electrode. Each of the first positioning pin and the second positioning pin is located at at least two positions that are point-symmetrical with respect to the center point between the first electrode and the second electrode.

According to this structure, in the tandem welding torch, when one and the other of the welding torches are moved by a collision with a foreign object such as an object to be welded or a jig, the first sensor shaft and the second sensor shaft fixed to the welding torches move in cooperation while the bulging portions are equally supported by the first and second positioning pins each located at two point-symmetrical positions. Hence, the first and second sensor shafts smoothly move, and the received impact is released by the first spring member and the second spring member to prevent deformation of the welding torch.

In the tandem welding torch, the received impact can be reliably detected by being transmitted to the first detector and the second detector.

Similarly, after movement, the tandem welding torch is smoothly and accurately returned to its original position by the spring forces of the first spring member and the second spring member, because the bulging portions are equally supported by the first and second positioning pins located at the point-symmetrical positions.

A tandem welding torch according to a second aspect of the present invention includes a torch fixing portion that fixes distal ends of two juxtaposed welding torches together, an insulation cover that protects proximal ends of the welding torches, a first torch proximal-end holding portion provided in the insulation cover to hold the proximal end of one of the welding torches, a second torch proximal-end holding portion provided in the insulation cover to hold the proximal end of the other welding torch, and a shock sensor unit that detects tilts and movements of the first torch proximal-end holding portion and the second torch proximal-end holding portion. The shock sensor unit includes a hollow first sensor shaft in which a first electrode is inserted, the first sensor shaft having a front end connected to the first torch proximal-end holding portion and a rear end having a bulging portion of an increased diameter, a hollow second sensor shaft in which a second electrode is inserted, the second sensor shaft extending in an axial direction of the first sensor shaft to be adjacent to the first sensor shaft and having a front end connected to the second torch proximal-end holding portion and a rear end having a bulging portion of an increased diameter, a first positioning pin provided in contact with an outer peripheral surface of the bulging portion of the first sensor shaft, a second positioning pin provided in contact with an outer peripheral surface of the bulging portion of the second sensor shaft, a first spring member that presses the first sensor shaft toward the distal end with a first spring guide being disposed therebetween, a second spring member provided adjacent to the first spring member to press the second sensor shaft toward the distal end with a second spring guide being disposed therebetween, a first sensor body that contains the first sensor shaft, the first positioning pin, and the first spring member movably, a second sensor body that contains the second sensor shaft, the second positioning pin, and the second spring member movably, a first detector that detects a movement in an axial direction of the first spring guide, and a second detector that detects a movement in an axial direction of the second spring guide. The first sensor body and the second sensor body are located at positions that are point-symmetrical with respect to a center point between the first electrode and the second electrode. Each of the first positioning pin and the second positioning pin is located at at least two positions on a first concentric circle centered on the center point between the first electrode and the second electrode.

According to this structure, in a case in which one or the other of the welding torches in the tandem welding torch is moved by a collision with an object to be welded, when the first sensor shaft and the second sensor shaft, which are moved in cooperation with the welding torch, move along the axial line and are returned to their original positions by the spring forces of the first spring member and the second spring member after movement, the bulging portions are supported by the first positioning pins and the second positioning pins each located at two positions on the first concentric circle centered on the center point between the first electrode and the second electrode. Hence, the first sensor shaft and the second sensor shaft smoothly move and accurately return to their original positions.

In the tandem welding torch, the received impact can be reliably detected by being transmitted to the first detector and the second detector.

Preferably, each of the first positioning pin and the second positioning pin is located at at least two positions on a second concentric circle having a radius different from that of the first concentric circle.

According to this structure, since each of the first positioning pin and the second positioning pin is located at at least two positions on the second concentric circle having a radius different from that of the first concentric circle, each of the bulging portions of the first sensor shaft and the second sensor shaft is supported by two or more positioning pins. Hence, the bulging portions can be supported such as to be guided and returned to original positions even when they are moved.

Preferably, each of the first positioning pin and the second positioning pin is located at two positions in a direction perpendicular to a center line that connects a center point of the first electrode and a center point of the second electrode.

According to this structure, since each of the first positioning pin and the second positioning pin is located at two positions in the direction perpendicular to the center line that connects the center point of the first electrode and the center point of the second electrode, the bulging portions of the first and second sensor shafts is supported by the two positioning pins located at the two positions at an equal distance from the center point between the electrodes. Hence, the bulging portions can be supported such as to be guided and returned to original positions even when they are moved.

Preferably, each of the first positioning pin and the second positioning pin is located at four positions in a direction of a center line that connects a center point of the first electrode and a center point of the second electrode and a direction orthogonal to the direction of the center line.

According to this structure, since each of the first positioning pin and the second positioning pin is located at four positions in the direction of the center line that connects the center point of the first electrode and the center point of the second electrode and the direction orthogonal to the direction of the center line, the bulging portions of the first sensor shaft and the second sensor shaft are supported by the first positioning pins and the second positioning pins. Hence, the bulging portions can be supported such as to be guided and returned to original positions even when they are moved.

The tandem welding torch of the present invention includes the shock sensor unit in which deformation of the welding torches is prevented by releasing, through the first spring member and the second spring member, an impact applied to the welding torches when the welding torches touch or collide with a foreign object, such as an object to be welded or a jig, and an accuracy of the welding torches in returning to original positions after the impact is released is increased. Hence, it is possible to suppress welding defects such as an undercut and incomplete penetration and to thereby improve welding quality.

BRIEF DESCRIPTION OF THE DRAWINGS

FIG. 7A illustrates a positional relationship between the first sensor shaft and the first detector in a normal state, FIG. 7B illustrates a positional relationship between the first sensor shaft and the first detector when the first sensor shaft tilts up, and FIG. 7C illustrates a positional relationship between the first sensor shaft and the first detector when the first sensor shaft moves rearward;

DESCRIPTION OF THE PREFERRED EMBODIMENTS

A tandem welding torch according to an embodiment of the present invention will be described with reference to the drawings.

Before a description of a tandem welding torch 2 according to the embodiment of the present invention is provided, a welding robot 1 equipped with the tandem welding torch 2 will be first described with reference to FIG. 1.

In the embodiment of the present invention, the tandem welding torch 2 changes its orientation in upward, downward, leftward, and rightward directions according to a welding operation state. For this reason, for convenience, upper, lower, left, and right sides in FIG. 1 are referred to as "up", "down", "front" and "rear", respectively, in the embodiment.

Configuration of Welding Robot

Figure 1:
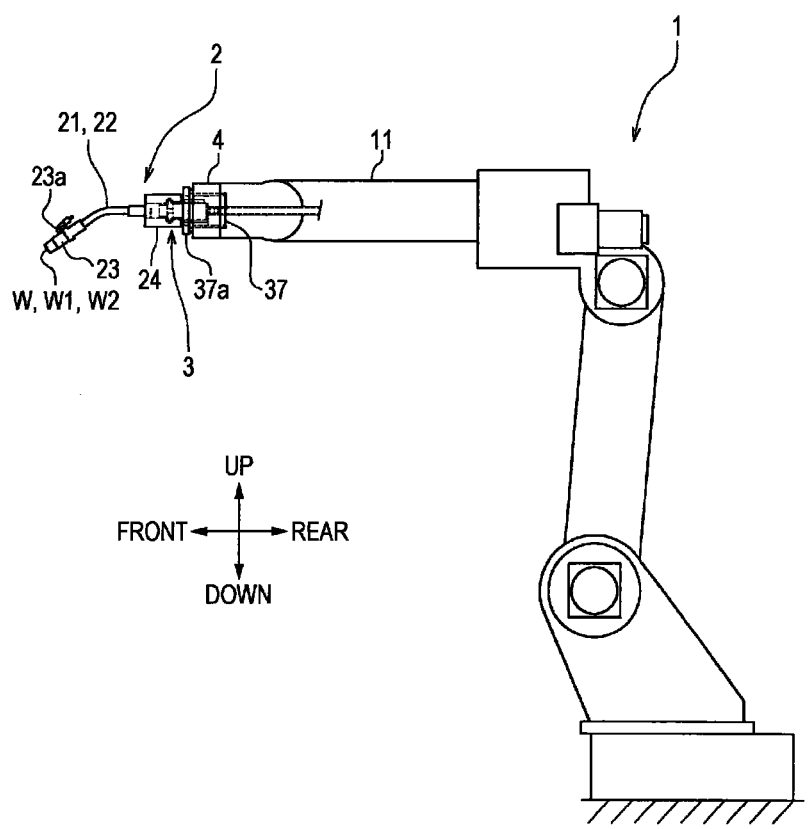
FIG. 1 is a principal cross-sectional view of a welding robot equipped with a tandem welding torch according to the present invention.

As illustrated in FIG. 1, the welding robot 1 is an automatic welding apparatus that can perform high-speed welding with high efficiency with a tandem welding torch 2. The tandem welding torch 2 performs tandem welding by simultaneously emitting arcs from two welding wires W (first electrode W1, second electrode W2). The welding wires W are unwound from unillustrated wire pools in unillustrated wire feeders and are automatically supplied to the tandem welding torch 2. The welding robot 1 conducts arc welding on an object while supplying the welding wires W and welding current.

The welding robot 1 mainly includes the tandem welding torch 2 that conducts welding on an object, a power supply (not illustrated) that supplies current to the welding wires W, the wire feeders that supply the wires W wound around the wire pools, and a robot arm 11 that moves the tandem welding torch 2.

The tandem welding torch 2 is attached to a distal end of the robot arm 11 with a shock sensor unit 3 being disposed therebetween.

Structure of Tandem Welding Torch

Figure 2:
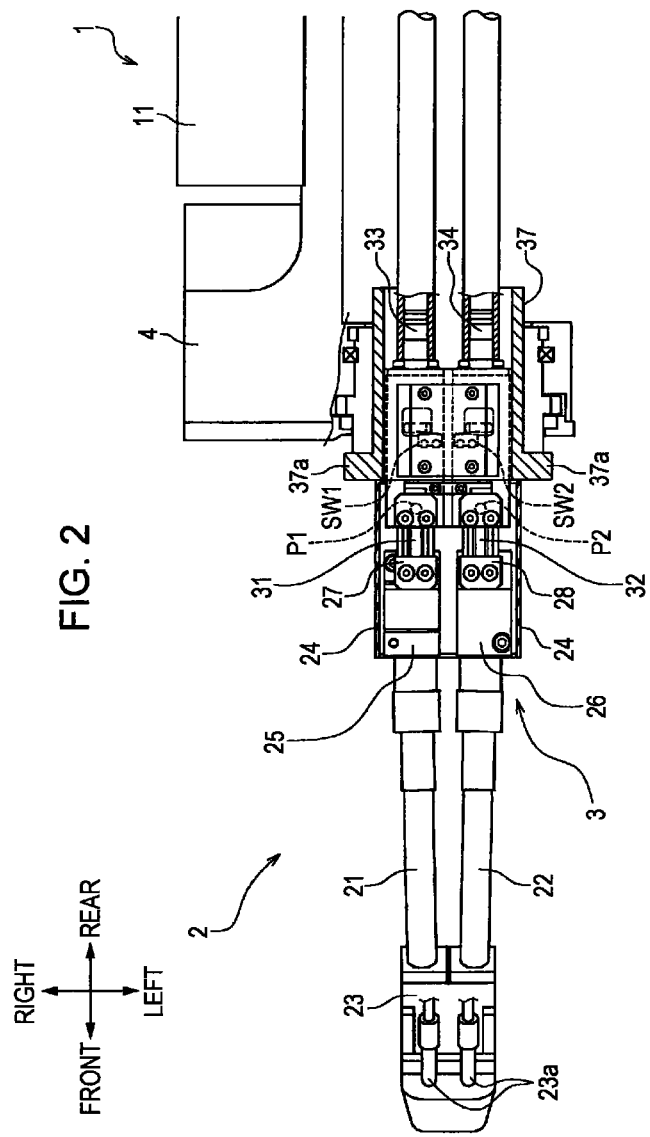
FIG. 2 is a principal plan view of the welding torch, including a partial cross section.
Figure 3:
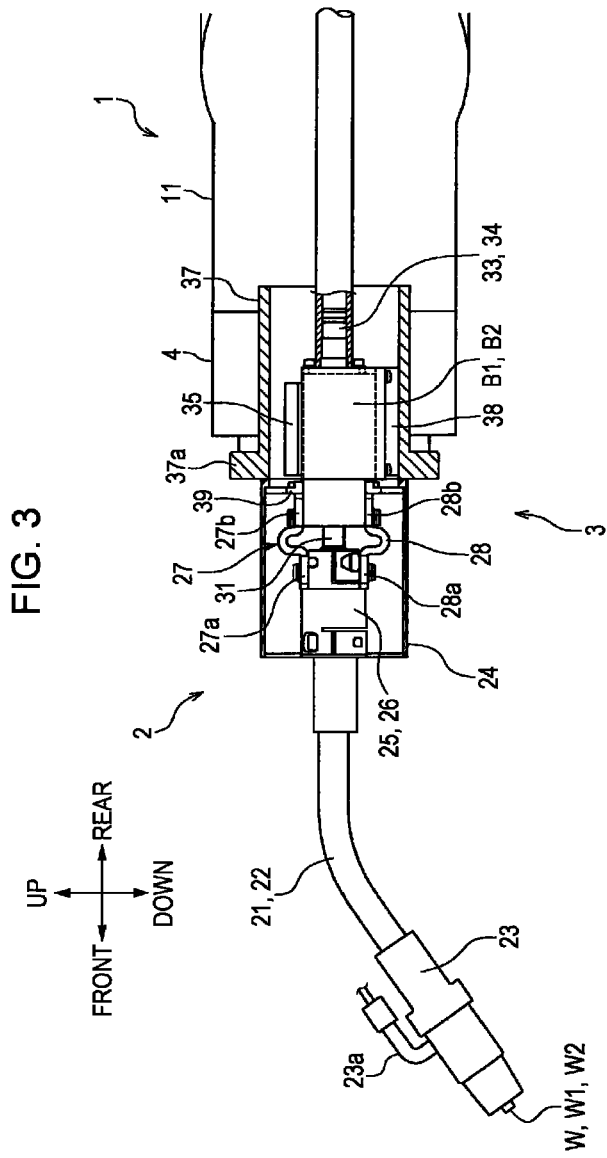
FIG. 3 is a principal side view of the welding torch, including a partial cross section.

As illustrated in FIGS. 2 and 3, the tandem welding torch 2 is an integrated two-electrode torch including two welding torches 21 and 22. The tandem welding torch 2 is a tool that performs welding while supplying a pair of welding wires W for welding an object, a welding current to be supplied to the welding wires W, and a shield gas. The tandem welding torch 2 mainly includes a torch fixing portion 23 for fixing the welding torches 21 and 22, an insulation cover 24 for protecting rear ends (proximal ends) of the welding torches 21 and 22, a first torch proximal-end holding portion 25 for holding the rear end (proximal end) of one of the welding torches, that is, the welding torch 21, a second torch proximal-end holding portion 26 for holding the proximal end of the other welding torch 22, a first electric connecting member 27 and a second electric connecting member 28 for electrically connecting the first torch proximal-end holding portion 25 and the second torch proximal-end holding portion 26, respectively, to a shock sensor unit 3, and the shock sensor unit 3 for detecting tilts and axial movements of the first and second torch proximal-end holding portions 25 and 26.

Structure of Welding Torches

As illustrated in FIG. 2, the welding torches 21 and 22 form a double torch composed of two juxtaposed torches. The welding torches 21 and 22 are formed by hollow cylindrical members through which the welding wires W (see FIG. 3) extend. Front ends of the welding torches 21 and 22 are fixed to the torch fixing portion 23, and rear ends thereof are fixed to the first and second torch proximal-end holding portions 25 and 26.

Structure of Torch Fixing Portion

The torch fixing portion 23 fixes the distal ends of the two welding torches 21 and 22 together. On an upper side of the torch fixing portion 23, a pair of hose connecting portions 23a are provided to supply cooling water from an unillustrated cooling-water supply source to the welding torches 21 and 22 via hoses.

Structure of Insulation Cover

As illustrated in FIGS. 2 and 3, the insulation cover 24 protects the rear ends (proximal ends) of the two welding torches 21 and 22, and is formed by a cylindrical insulation member, such as a rubber member, which contains the first and second torch proximal-end holding portions 25 and 26 and the first and second electric connecting members 27 and 28 movably. A rear aperture edge of the insulation cover 24 is fixed to an inner edge of a flange 37a of a sensor case body 37 shaped like a flanged cylinder.

Figure 4:
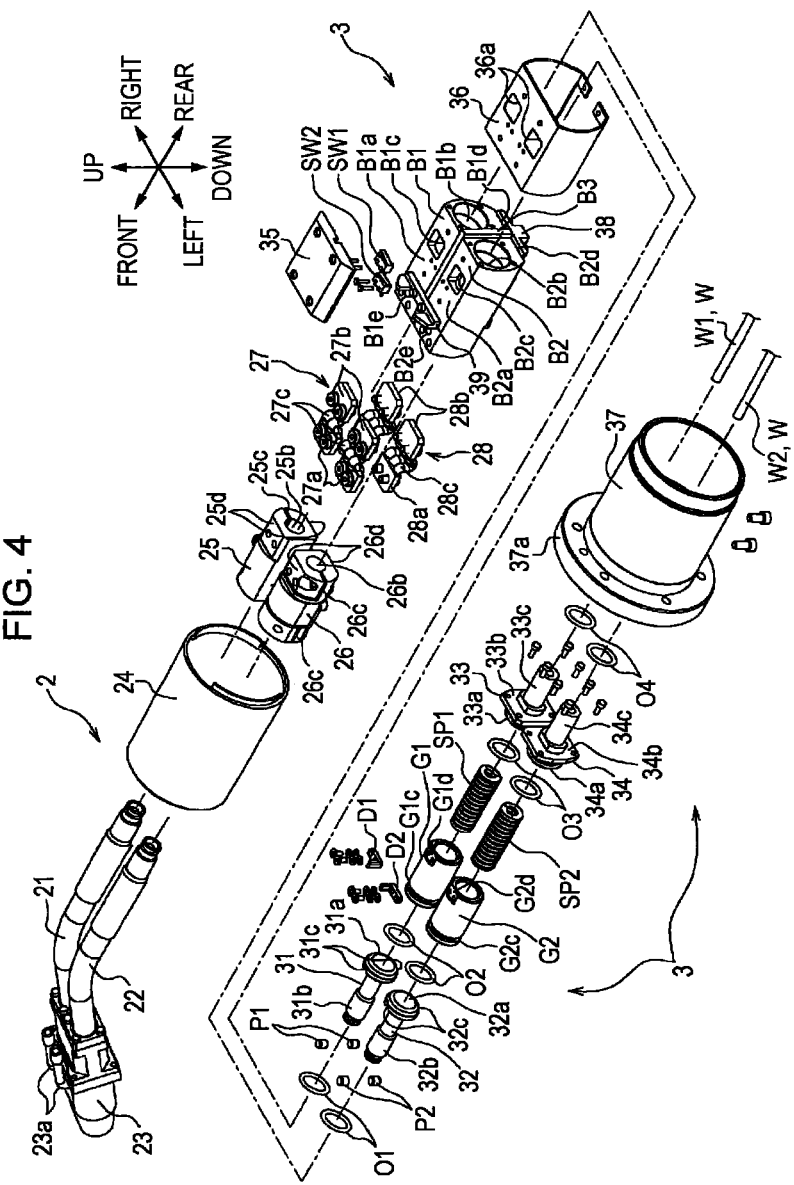
FIG. 4 is an exploded perspective view of the tandem welding torch.
Figure 5:
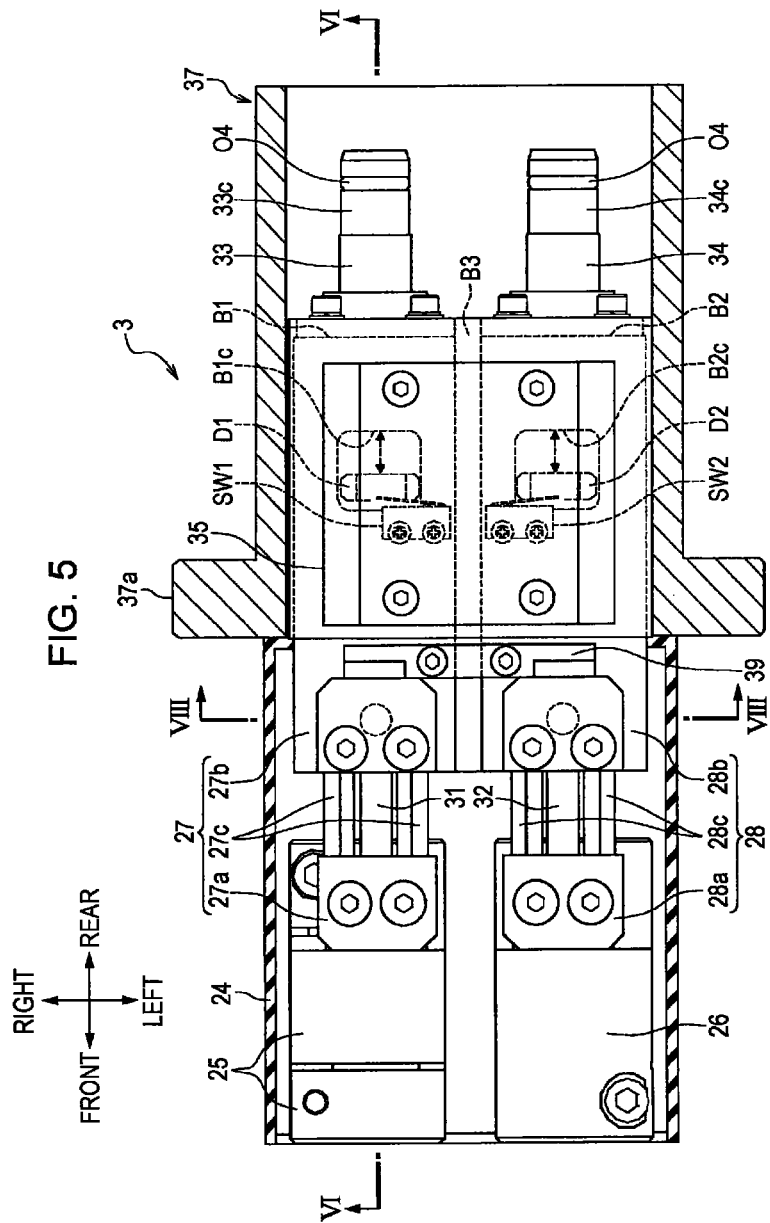
FIG. 5 is an enlarged transverse sectional view of a shock sensor unit in the tandem welding torch.

Structures of First Torch Proximal-End Holding Portion and Second Torch Proximal-End Holding Portion As illustrated in FIG. 4, the first torch proximal-end holding portion 25 and the second torch proximal-end holding portion 26 are torch connectors that hold the rear ends (proximal ends) of the welding torches 21 and 22, respectively, and are formed by electrically conductive cylindrical members juxtaposed with a predetermined space therebetween in the insulation cover 24. The first and second torch proximal-end holding portions 25 and 26 respectively include expanding slits 25c and 26c that give elasticity to front opening portions 25a and 26a (see FIG. 6) and rear opening portions 25b and 26b in an outer peripheral direction, and attachment faces 25d and 26d that allow the first and second electric connecting members 27 and 28 to be attached to upper and lower outer faces of the rear opening portions 25b and 26b. To the first and second torch proximal-end holding portions 25 and 26, wire connectors are screwed. The wire connectors are equipped with power feed wires that are routed from the interior of the sensor case body 37 along an outer side surface of the robot arm 11 and connected to the power supply (not illustrated).

The welding torches 21 and 22 are inserted in the front opening portions 25a and 26a (see FIG. 6), respectively, and are fixed by fasteners (not illustrated).

Distal ends of cylindrical portions 31b and 32b of first and second sensor shafts 31 and 32 are inserted in the rear opening portions 25b and 26b, respectively, and are fixed by fasteners (not illustrated). O-rings O1 are fitted on the distal ends of the cylindrical portions 31b and 32b.

When outer sides of the front opening portions 25a and 26a (see FIG. 6) and the rear opening portions 25b and 26b are tightened by the fasteners (not illustrated), the expanding slits 25c and 26c cause the front opening portions 25a and 26a and the rear opening portions 25b and 26b to decrease in diameter in the outer peripheral direction so that the welding torches 21 and 22 and the cylindrical portions 31b and 32b can be fixed firmly. The expanding slits 25c and 26c extend from end faces of the front opening portions 25a and 26a and the rear opening portions 25b and 26b to outer sides of portions where the welding torches 21 and 22 and the cylindrical portions 31b and 32b are inserted.

The attachment faces 25d and 26d are portions to which connecting plates 27a and 28a of the first and second electric connecting members 27 and 28 are screwed, respectively, and are formed by rear upper and lower flat faces of the first and second torch proximal-end holding portions 25 and 26.

Structures of First Electric Connecting Member and Second Electric Connecting Member As illustrated in FIG. 4, the first electric connecting member 27 and the second electric connecting member 28 electrically connect the first torch proximal-end holding portion 25 and the second torch proximal-end holding portion 26 to a first sensor body B1 and a second sensor body B2, respectively, such that the first torch proximal-end holding portion 25 and the second torch proximal-end holding portion 26 can swing.

The first and second electric connecting members 27 and 28 respectively include connecting plates 27a and 28a to be fixed to the upper and lower attachment faces 25d and 26d of the first and second torch proximal-end holding portions 25 and 26, connecting plates 27b and 28b to be fixed to front sides of attachment faces B1a and B2a provided on upper and lower front sides of the first and second sensor bodies B1 and B2, and connecting cables 27c and 28c for connecting the connecting plates 27a and 28a to the connecting plates 27b and 28b, respectively.

The first sensor body B1 and the second sensor body B2 are located at positions that are point-symmetrical with respect to a center point O between the first electrode W1 and the second electrode W2.

The connecting plates 27a, 27b, 28a, and 28b are formed by rectangular conductive flat plates, and are screwed to the attachment faces 25d, 26d, B1a, and B2a, respectively.

The connecting cables 27c and 28c are routed between the connecting plates 27a and 28a to be fixed to the first and second torch proximal-end holding portions 25 and 26 and the connecting plates 27b and 28b to be fixed to the first and second sensor bodies B1 and B2. The connecting cables 27c and 28c are outwardly curved in symmetrical upward and downward directions in side view so that the first and second torch proximal-end holding portions 25 and 26 can tilt or move in the axial direction in operative connection with the welding torches 21 and 22.

Structure of Shock Sensor Unit

As illustrated in FIG. 4, the shock sensor unit 3 is a sensor that detects movements of the welding torches 21 and 22 and protects the welding torches 21 and 22 when the welding torches 21 and 22 touch or collide with a foreign object such as an object to be welded or a jig. The shock sensor unit 3 also functions as a protection unit that stops the welding robot 1 when detecting tilts and movements of the first and second torch proximal-end holding portions 25 and 26 with first and second detectors SW1 and SW2. The shock sensor unit 3 is interposed between the distal end of the robot arm 11 and the welding torches 21 and 22, and elastically supports the rear ends (proximal ends) of the welding torches 21 and 22 so that the welding torches 21 and 22 can tilt (see FIG. 7B), move in the axial direction (see FIG. 7C), and automatically return.

As will be described below, the shock sensor unit 3 includes a first sensor shaft 31, a second sensor shaft 32, first positioning pins P1, second positioning pins P2, a first spring member SP1, a second spring member SP2, a first sensor body B1, a second sensor body B2, an insulation member B3, a first detector SW1, a second detector SW2, a first power feed adaptor 33, a second power feed adaptor 34, a sensor cover 35, a rubber sheet 36, a sensor case body 37, and an insulation bracket 38.

Structures of First Sensor Shaft and Second Sensor Shaft

As illustrated in FIG. 4, the first sensor shaft 31 and the second sensor shaft 32 are formed by substantially flanged cylindrical hollow and conductive metallic members in which the first electrode W1 and the second electrode W2 are inserted, respectively. The first and second sensor shafts 31 and 32 have the same shape, and extend in the axial direction to be adjacent to each other. The first and second sensor shafts 31 and 32 are arranged to tilt the welding torches 21 and 22 (tilt in directions of arrows a and b in FIGS. 6 and 7B) and move the welding torches 21 and 22 (move in a direction of arrow c in FIGS. 6 and 7C) integrally with the first and second torch proximal-end holding portions 25 and 26 being disposed therebetween.

The first and second sensor shafts 31 and 32 include cylindrical portions 31b and 32b provided at front ends thereof, bulging portions 31a and 32a provided at rear ends thereof, and engaging portions 31c and 32c provided on outer peripheral surfaces of the bulging portions 31a and 32a, respectively.

Figure 6:
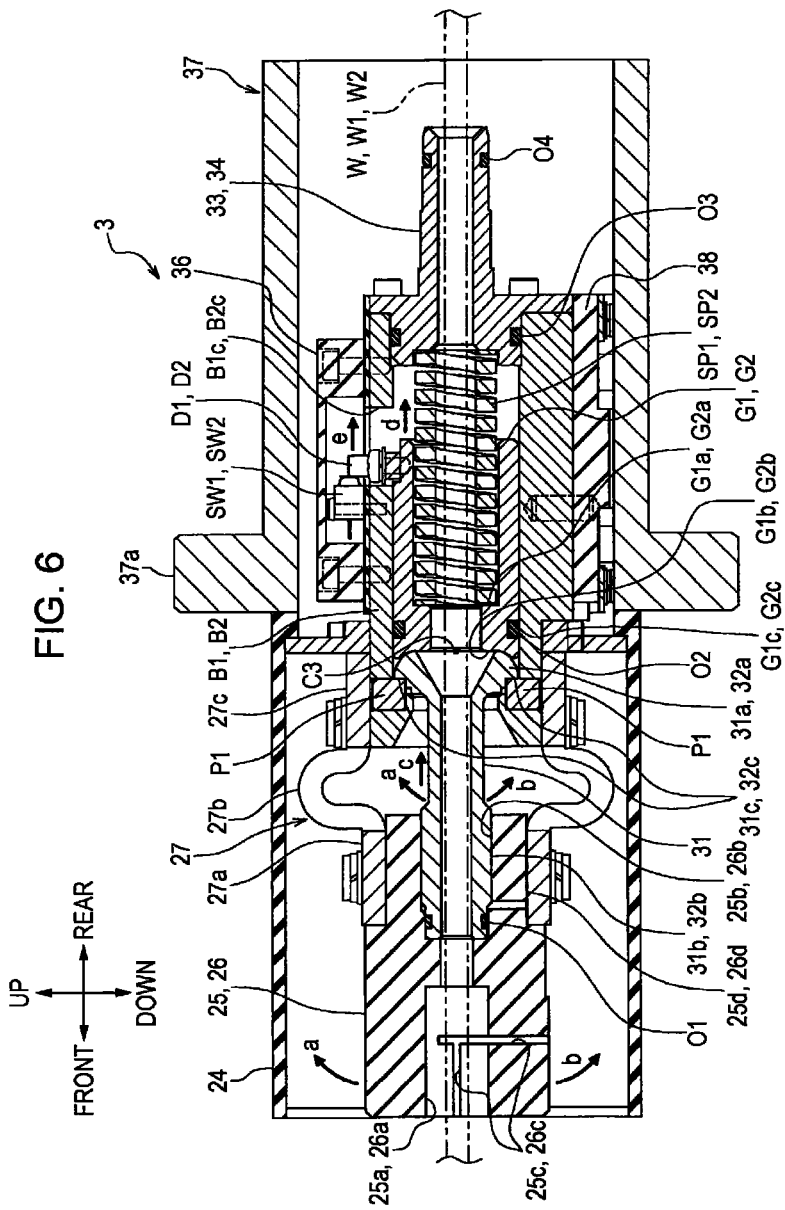
FIG. 6 is a cross-sectional view, taken along line VI-VI of FIG. 5.

As illustrated in FIG. 6, the bulging portions 31a and 32a are annular portions of an increased diameter provided at the rear ends of the first and second sensor shafts 31 and 32, respectively. On upper and lower sides of the outer peripheral surfaces of the bulging portions 31a and 32a, the engaging portions 31c and 32c are provided in the shape of a recess in front view. The first and second positioning pins P1 and P2 are engaged with the engaging portions 31c and 32c, respectively. Inner wall surfaces of the bulging portions 31a and 32a are nearly tapered to increase in diameter toward rear ends. For this reason, the first and second sensor shafts 31 and 32 can tilt about the bulging portions 31a and 32a, respectively, even when the first and second electrodes W1 and W2 are inserted therein (see FIG. 7C).

Front ends of the cylindrical portions 31b and 32b are inserted in and connected to the first and second torch proximal-end holding portions 25 and 26, respectively. O-rings O1 are fitted on the front ends of the cylindrical portions 31b and 32b.

The engaging portions 31c and 32c are positioning engaging grooves with which rear ends (proximal ends) of the first and second positioning pins P1 and P2 are engaged in position, respectively. The engaging portions 31c and 32c are cut in an L-shape in side view. Since the engaging portions 31c and 32c are thus shaped like the engaging grooves with which the first and second positioning pins P1 and P2 are engaged in position, they serve to position the first and second positioning pins P1 and P2 so that the first and second positioning pins P1 and P2 return to their original engaging states even when they are moved.

Structures of First Positioning Pin and Second Positioning Pin

Figure 8:
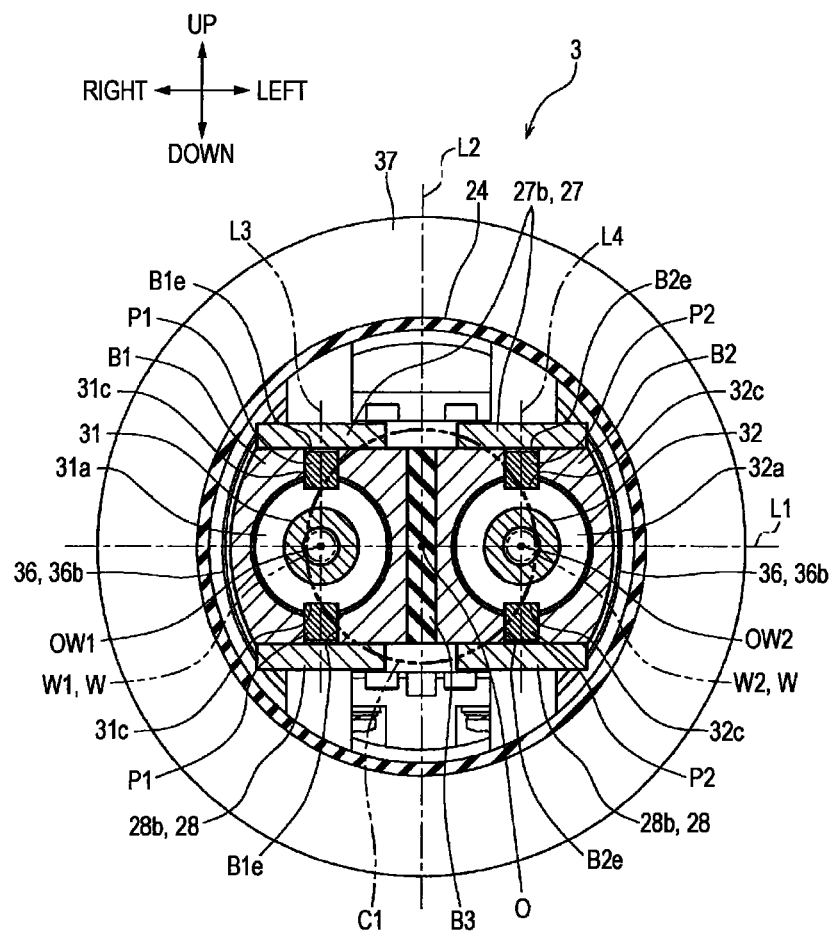
FIG. 8 is a cross-sectional view, taken along line VIII-VIII of FIG. 5.

As illustrated in FIG. 8, the first positioning pins P1 and the second positioning pins P2 are formed by similar members that are line-symmetrical and point-symmetrical with respect to the insulation member B3 that vertically extends at a center point O between the first electrode W1 and the second electrode W2. The first positioning pins P1 and P2 are inserted in pin insertion holes B1e and B2e of the first and second sensor bodies B1 and B2, and are engaged on axial center sides with the engaging portions 31c and 32c provided on the outer peripheral surfaces of the bulging portions 31a and 32a of the first and second sensor shafts 31 and 32, respectively. Outer apertures of the pin insertion holes B1e and B2e are closed by the connecting plates 27b and 28b of the first and second electric connecting members 27 and 28, respectively, so that the first and second positioning pins P1 and P2 can slightly move up and down.

Since the first and second positioning pins P1 and P2 are thus meshed with the engaging portions 31c and 32c, respectively, they automatically return to predetermined positions on the axes even when the first and second sensor shafts 31 and 32 tilt or move in the axial direction.

The first positioning pins P1 and the second positioning pins P2 are formed by columnar steel members. The first positioning pins P1 are provided at two upper and lower positions on a center line L3 centered on a center point OW1 of the first electrode W1, and the second positioning pins P2 are provided at two upper and lower positions on a center line L4 centered on a center point OW2 of the second electrode W2.

In other words, each of the first positioning pins P1 and the second positioning pins P2 are provided at at least two points on a concentric circle C1 centered on the center point O between the first electrode W1 and the second electrode W2. Here, each of the first positioning pins P1 and the second positioning pins P2 are located at two line-symmetric positions on the upper and lower sides of the center points OW1 and OW2 of the first electrode W1 and the second electrode W2.

Structures of First Spring Member and Second Spring Member

As illustrated in FIG. 4, the first spring member SP1 and the second spring member SP2 are formed by similar members provided adjacent to each other along an axis line L1 (see FIG. 8). The first and second spring members SP1 and SP2 press the first and second sensor shafts 31 and 32 toward the front ends with first and spring guides G1 and G2 being disposed therebetween, respectively, and are formed by helical compression springs for example.

Structures of First Spring Guide and Second Spring Guide

As illustrated in FIG. 4, the first spring guide G1 and the second spring guide G2 are formed by cylindrical conductive metallic members or nonconductive resin members of the same shape, and support front ends of the first spring member SP1 and the second spring member SP2, respectively. The first and second spring guides G1 and G2 are provided adjacent to each other in cavities B1b and B2b of the first and second sensor bodies B1 and B2, respectively, and are movable in the axial direction.

As illustrated in FIG. 6, the first and second spring guides G1 and G2 include spring receiving portions G1a and G2a that support the front ends of the first and second spring members SP1 and SP2, contact faces G1b and G2b in contact with the bulging portions 31a and 32a, annular grooves G1c and G2c with which O-rings O2 are engaged, and dog attachment faces G1d and G2d to which dogs D1 and D2 are attached, respectively.

The spring receiving portions G1a and G2a are in contact with the front ends of the first and second spring members SP1 and SP2, respectively, and are formed by annular inner bottom faces provided at inner peripheral edges of the front ends of the cylindrical first and second spring guides G1 and G2.

The contact faces G1b and G2b are provided on front end faces of the first and second spring guides G1 and G2, and are concave nearly in the shape of a mortar in accordance with the surface shape of the tiltable bulging portions 31a and 32a.

As illustrated in FIG. 4, the O-rings O2 are engaged with the annular grooves G1c and G2c. The annular grooves G1c and G2c are formed by ring-shaped concave grooves provided on the outer peripheral surfaces near the front ends of the first and second spring guides G1 and G2.

The dogs D1 and D2 for attaching the first and second detectors SW1 and SW2 are screwed to the dog attachment faces G1d and G2d, respectively. The dog attachment faces G1d and G2d are formed by flat faces provided on upper outer peripheral surfaces near the front ends of the first and second spring guides G1 and G2.

Structures of First Sensor Body and Second Sensor Body

The first sensor body B1 and the second sensor body B2 are cylindrical conductive metallic members in which the first and second sensor shafts 31 and 32, the first and second positioning pins P1 and P2, and the first and second spring members SP1 and SP2 are movably contained, and are formed of duralumin as an example. The first and second sensor bodies B1 and B2 are located at positions that are point-symmetrical with respect to the center point O between the first and second electrodes W1 and W2, and have line-symmetrical shapes such that opposing, upper and lower faces thereof are flat.

The first and second sensor bodies B1 and B2 respectively include the above-described attachment faces B1a and B2a, the above-described cavities B1b and B2b, dog arrangement holes B1c and B2c communicating between the attachment faces B1a and B2a and the cavities B1b and B2b, lower flat faces B1d and B2d to which an insulation bracket 38 is fixed, the pin insertion holes B1e and B2e in which the first and second positioning pins P1 and P2 are inserted, an insulation-cover fixing member 39 provided on the attachment faces B1a and B2a, a sensor cover 35 that covers the attachment faces B1a and B2a, a rubber sheet 36 that holds the first and second sensor bodies B1 and B2, the insulation member B3 provided between the first and second sensor bodies B1 and B2, and an insulation bracket 38 provided under the first and second sensor bodies B1 and B2 and the insulation member B3.

To the attachment faces B1a and B2a, the insulation-cover fixing member 39, the first and second detectors SW1 and SW2, and the rubber sheet 36 are attached. The attachment faces B1a and B2a are formed by flat faces provided on outer upper faces of the first and second sensor bodies B1 and B2, respectively.

The cavities B1b and B2b are columnar spaces in which the first and second spring guides G1 and G2 are inserted, respectively, and extend in the axial direction.

The dog arrangement holes B1c and B2c are through holes in which the dogs D1 and D2 are loosely fitted to be movable in the axial direction (rearward). The dogs D1 and D2 move together with the first and second spring guides G1 and G2 provided movably in the axial direction in the first and second sensor bodies B1 and B2. The dog arrangement holes B1c and B2c are substantially square such that the dogs D1 and D2, which are shaped like a rectangle extending long in the right-left direction in plan view, can move in the front-rear direction.

The insulation bracket 38 is screwed to the lower flat faces B1d and B2d. The lower flat faces B1d and B2d are formed by horizontal faces provided on lower surfaces of the first and second sensor bodies B1 and B2.

The first and second positioning pins P1 and P2, which are engaged on the axial center sides with the engaging portions 31c and 32c, are inserted in the pin insertion holes B1e and B2e, respectively.

The insulation-cover fixing member 39 fixes the insulation cover 24 to the shock sensor unit 3. The insulation-cover fixing member 39 is formed of an insulating material such as engineering plastic, and is screwed to front-side positions on the attachment faces B1a and B2a.

Structure of Sensor Cover

The sensor cover 35 is a resin cover that covers and protects the first and second detectors SW1 and SW2 and the dogs D1 and D2 which project upward from the rubber sheet 36 holding the attachment faces B1a and B2a. For example, the sensor cover 35 is formed by a platelike member formed of engineering plastic. The sensor cover 35 extends from the attachment face B1a of the first sensor body B1 to the attachment face B2a of the second sensor body B2 and is screwed to the attachment faces B1a and B2a.

The rubber sheet 36 is an insulation cover that covers surfaces of the attachment faces B1a and B2a on which the first and second detectors SW1 and SW2 and the sensor cover 35 are arranged, and outer side faces of the first and second sensor bodies B1 and B2, and is shaped nearly like a lip channel in front view. An upper surface of the rubber sheet 36 has through holes in which screw members for screwing the first and second detectors SW1 and SW2 and the sensor cover 35 are to be inserted, and through holes 36a aligned with the dog arrangement holes B1c and B2c, respectively.

Structures of Insulation Member and Insulation Bracket

The insulation member B3 is a resin plate member provided between the first and second sensor bodies B1 and B2 to isolate the sensor bodies B1 and B2, and is clamped therebetween.

The insulation bracket 38 is an insulation plate member that holds the first and second sensor bodies B1 and B2 and the insulation member B3 from below, and is screwed to lower surfaces of the first and second sensor bodies B1 and B2.

Structures of First Detector and Second Detector

The first detector SW1 and the second detector SW2 are sensors that stop the welding robot 1 when detecting movements in the axial direction of the first spring guide G1 and the second spring guide G2, respectively. For example, the first and second detectors SW1 and SW2 are formed by hinge-lever type microswitches. That is, when the welding torches 21 and 22 tilt or move in the axial direction, the first and second sensor shafts 31 and 32, which move together with the welding torches 21 and 22, turn the first and second detectors SW1 and SW2 on and off in response to transmission of the movements of the welding torches 21 and 22 via the first and second spring guides G1 and G2 and the dogs D1 and D2. The first and second detectors SW1 and SW2 are normally placed in an ON state such that the dogs D1 and D2 press movable contact members, and are placed in an OFF state such that the dogs D1 and D2 separate from the movable contact members when the welding torches 21 and 22 and the first and second sensor shafts 31 and 32 are moved. Terminals of the first and second detectors SW1 and SW2 are connected to the first and second sensor bodies B1 and B2, respectively, via the rubber sheet 36.

Structures of First Power Feed Adaptor and Second Power Feed Adaptor

The first power feed adaptor 33 and the second power feed adaptor 34 are formed by flanged cylinders formed of an electrically conductive metal, and are screwed to rear end faces of the first sensor body B1 and the second sensor body B2, respectively. The first and second power feed adaptors 33 and 34 respectively include spring receiving portions 33a and 34a for supporting the rear ends of the first and second spring members SP1 and SP2, flanges 33b and 34b having a plurality of threaded holes, and cylindrical connecting portions 33c and 34c on which power feed dampers (not illustrated) are fitted. These parts are provided integrally.

The spring receiving portions 33a and 34a are cylindrical portions to be inserted in the cavities B1b and B2b, respectively, and have O-rings O3 attached to outer peripheral portions thereof.

The flanges 33b and 34b allow the first and second power feed adaptors 33 and 34 to be screwed to rear peripheral edge portions of the cavities B1b and B2b of the first and second sensor bodies B1 and B2.

The cylindrical connecting portions 33c and 34c extend rearward from the flanges 33b and 34b, respectively, and tubular power feed dampers (not illustrated) are fitted thereon.

Structure of Sensor Case Body

The sensor case body 37 is formed by a flanged cylindrical conductive metallic member provided to cover the outer peripheries of the first and second sensor bodies B1 and B2, and has, at its front end, a flange 37a having holes used to screw the sensor case body 37 to a robot wrist 4.

Operation of Welding Torch

Next, operation of the tandem welding torch 2 will be described with reference to FIGS. 1 to 8.

As illustrated in FIG. 1, when welding is performed with the tandem welding torch 2, first, the power supply (not illustrated) for the welding robot 1 is turned on. Current from the power supply flows to an object to be welded through unillustrated electric wires and the first and second electrodes W1 and W2 routed along the outer side surface of the robot arm 11 as the two welding wires W for the welding torches 21 and 22, so that arcs are produced. The welding torches 21 and 22 perform tandem welding while being moved by the robot arm 11. A ground current flows from the object toward the power supply.

Then, cooling water is supplied from the unillustrated cooling-water supply source into the torch fixing portion 23 through the hoses (not illustrated) and the hose connecting portions 23a, and cools the distal ends of the welding torches 21 and 22 heated by welding.

Figure 7A:
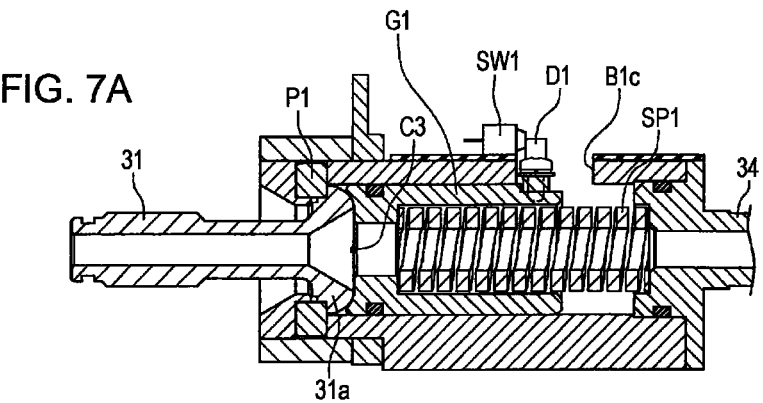
FIGS. 7A to 7C are principal longitudinal sectional views illustrating the relationship between a first sensor shaft and a first detector.
Figure 7B:
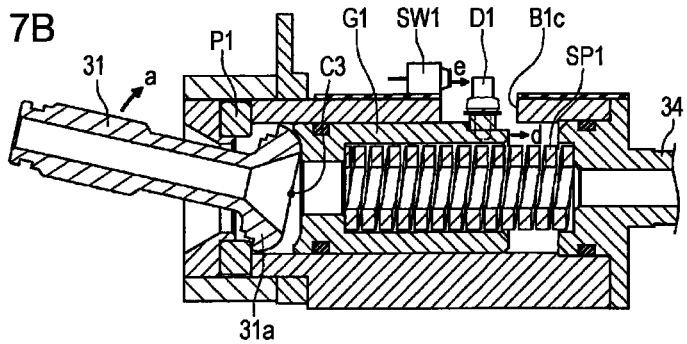
Figure 7C:
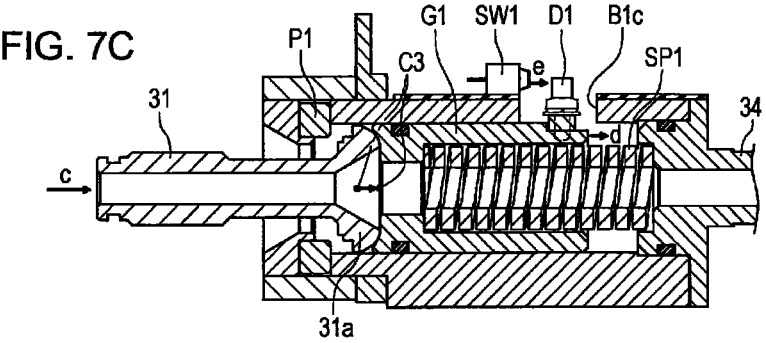

For example, when the welding torches 21 and 22 are tilted or moved in the axial direction from the state of FIG. 7A by contact or collision with a foreign object, such as an object to be welded or a jig, during welding, the first and second torch proximal-end holding portions 25 and 26 and the first and second sensor shafts 31 and 32 tilt (in the directions of arrows a and b) in the axial direction (in the direction of arrow c) together with the welding torches 21 and 22, as illustrated in FIGS. 7B and 7C.

As illustrated in FIG. 7B, when the welding torches 21 and 22 and the first and second sensor shafts 31 and 32 tilt in the upward, downward, leftward, or rightward direction, they tilt in the upward, downward, leftward, or rightward direction (in the direction of arrow a or b) about center points C3 of the bulging portions 31a and 32a. For example, when the welding torches 21 and 22 are tilted in the upward direction (direction of arrow a) by a collision with the object to be welded, they tilt about the center points C3 of the first and second sensor shafts 31 and 32, respectively. Hence, the bulging portions 31a and 32a move the first and second spring guides G1 and G2 and the dogs D1 and D2 rearward (in a direction of arrow d) while compressing the first and second spring members SP1 and SP2.

Then, since the dogs D1 and D2, which have placed the first and second detectors SW1 and SW2 in the ON state by pressing the movable contact members of the detectors SW1 and SW2, move rearward (in a direction of arrow e) away from the movable contact members, the detectors SW1 and SW2 are turned off. Thus, it is detected that any of the welding torches 21 and 22 is brought into an abnormal state by a collision with the foreign object, and the welding robot 1 is stopped.

When the welding torches 21 and 22 separate from the object to be welded after the collision, the first and second sensor shafts 31 and 32 are returned to their original positions by the spring forces of the first and second spring members SP1 and SP2 transmitted via the first and second spring guides G1 and G2. For this reason, the welding torches 21 and 22, the dogs D1 and D2, and the first and second detectors SW1 and SW2 are also returned to their original positions, and the first and second detectors SW1 and SW2 are returned to the ON state.

As illustrated in FIG. 7C, when the welding torches 21 and 22 move in the axial center direction, a similar operation is performed.

When the first and second sensor shafts 31 and 32 return from the state of FIG. 7B or 7C to the state of FIG. 7A, since the engaging portions 31c and 32c of the bulging portions 31a and 32a are meshed with the upper and lower positioning pins P1 and P2, as illustrated in FIGS. 6 and 8, tilts and movements in the axial direction of the first and second sensor shafts 31 and 32 are guided by the positioning pins P1 and P2. Hence, even when the first and second sensor shafts 31 and 32 are moved, they are smoothly guided and returned to their original positions.

Therefore, even when the welding torches 21 and 22, which move together with the first and second sensor shafts 31 and 32, are tilted or moved in the axial direction by contact with a foreign object, such as an object to be welded, they smoothly return to their original positions. Hence, the two welding wires W located at the distal ends of the welding torches 21 and 22 of the welding robot 1 are prevented from misalignment, and keep accurately performing welding along the welding line.

In this way, in the tandem welding torch 2 according to the embodiment of the present invention, even when the welding torches 21 and 22 collide with a foreign object such as an object to be welded, the welding torches 21 and 22 and the first and second sensor shafts 31 and 32 tilt or move rearward together, elastically move away from the foreign object while compressing the first and second spring members SP1 and SP2, and detect the collision with the foreign object. Hence, the impact force applied to the welding torches 21 and 22 can be absorbed. This can prevent the welding torches 21 and 22 from deformation and damage.

When the first and second sensor shafts 31 and 32 tilt or move rearward, the first and second positioning pins P1 and P2 engaged with the engaging portions 31c and 32c provided on the outer peripheries of the bulging portions 31a and 32a guide movements of the bulging portions 31a and 32a. Hence, the movements of the first and second sensor shafts 31 and 32 are stabilized. Even when the first and sensor shafts 31 and 32 move, they can smoothly return to their original positions.

As a result, the tandem welding torch 2 can accurately perform tandem welding while the two welding torches 21 and 22 are kept at predetermined positions.

Modification

While the embodiment of the present invention has been described above, the present invention is not limited to the above-described embodiment, and may be appropriately modified without departing from the scope of the invention. The above-described structures are denoted by the same reference numerals, and descriptions thereof are skipped.

Figure 9:
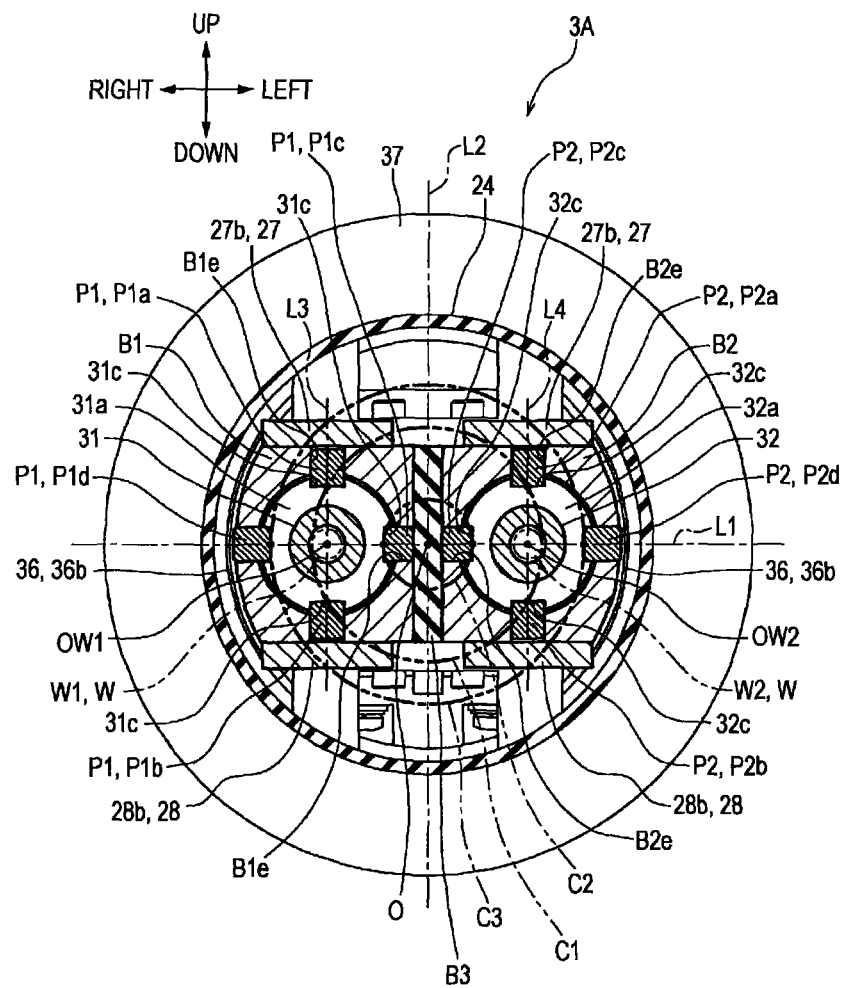
FIG. 9 is an enlarged vertical sectional view of a shock sensor unit in a modification of the tandem welding torch of the present invention.

FIG. 9 is an enlarged vertical sectional view of a shock sensor unit 3A in a modification of the tandem welding torch according to the embodiment.

While each of the first positioning pins P1 and the second positioning pins P2 are located at two upper and lower positions on the corresponding bulging portion 31a or 32a of the first or second sensor shaft 31 or 32 in the above embodiment, as illustrated in FIG. 8, the present invention is not limited thereto. For example, as illustrated in FIG. 9, the number of positioning pins may be further increased by providing each of first positioning pins P1 (P1a, P1b, P1c, and P1d) and second positioning pins P2 (P2a, P2b, P2c, and P2d) at at least four (two or more) positions on concentric circles C2 and C3 having a radius different from that of a concentric circle C1 centered on a center point O.

In this case, pin insertion holes B1e are formed at four upper, lower, right, and left positions of the first sensor body B1, and pin insertion holes B2e are formed at four upper, lower, right, and left positions of the second sensor body B2. The first positioning pins P1 (P1a, P1b, P1c, and P1d) and the second positioning pins P2 (P2a, P2b, P2c, and P2d) are inserted in the pin insertion holes B1e and B2e. Similarly, engaging portions 31c are formed at four upper, lower, right, and left positions of the bulging portion 31a of the first sensor shaft 31, and engaging portions 32c are formed at four upper, lower, right, and left positions of the bulging portion 32a of the second sensor shaft 32. Ends of the first positioning pins P1 (P1a, P1b, P1c, and P1d) and ends of the second positioning pins P2 (P2a, P2b, P2c, and P2d) are engaged with the engaging portions 31c and 32c.

An insulation member B3 is provided between the first positioning pin P1 (P1c) and the second positioning pin P2 (P2c) located near the center point O, and supports the positioning pins P1 and P2.

The first positioning pin P1 (P1d) and the second positioning pin P2 (P2d) remote from the center point O in the right-left direction are supported in a manner illustrated in FIG. 9.

In this way, in the first and second sensor shafts 31 and 32, the first positioning pins P1 and the second positioning pins P2 are inserted in the engaging portions 31c and 32c each provided at the four upper, lower, right, and left positions on the outer peripheral surfaces of the bulging portions 31a and 32a, and each of the engaging portions 31c and 32c is supported by the four upper, lower, right, and left positioning pins.

Thus, the first sensor shaft 31 and the second sensor shaft 32 are supported while the four upper, lower, right, and left positions on the outer periphery of each of the bulging portions 31a and 32a are engaged. Hence, even when the first and second sensor shafts 31 and 32 tilt or move in the axial direction, they can be guided to smoothly return to their original positions.

Other Modifications

The first positioning pins P1 (P1a, P1b, P1c, and P1d) and the second positioning pins P2 (P2a, P2b, P2c, and P2d) adopted in the above modification may be arranged in a manner different from the arrangement manner of FIG. 9 as long as they are located on the concentric circles C2 and C3 having a radius different from that of the concentric circle C1 centered on the center point O.

For example, the first positioning pins P1 (P1a, P1b, P1c, and P1d) and the second positioning pins P2 (P2a, P2b, P2c, and P2d) may be located at positions that are line-symmetrical with respect to center lines L3 and L4 extending in the up-down direction and arranged in directions oblique to the center lines L3 and L4.

In this case, the first positioning pins P1 (P1a, P1b, P1c, and P1d) and the second positioning pins P2 (P2a, P2b, P2c, and P2d) can also support the outer peripheral portions of the bulging portions 31a and 32a of the first and second sensor shafts 31 and 32 in a well balanced manner, because the positioning pins are arranged in a balanced manner with respect to the center lines L3 and L4 in the right-left direction.

What is claimed is:

1. A tandem welding torch comprising:
a torch fixing portion that fixes distal ends of two juxtaposed welding torches together;
an insulation cover that protects proximal ends of the welding torches;
a first torch proximal-end holding portion provided in the insulation cover to hold the proximal end of one of the welding torches;
a second torch proximal-end holding portion provided in the insulation cover to hold the proximal end of the other welding torch; and
a shock sensor unit that detects tilts and movements of the first torch proximal-end holding portion and the second torch proximal-end holding portion,
wherein the shock sensor unit includes
a hollow first sensor shaft in which a first electrode is inserted, the first sensor shaft having a front end connected to the first torch proximal-end holding portion and a rear end having a bulging portion of an increased diameter,
a hollow second sensor shaft in which a second electrode is inserted, the second sensor shaft extending in an axial direction of the first sensor shaft to be adjacent to the first sensor shaft and having a front end connected to the second torch proximal-end holding portion and a rear end having a bulging portion of an increased diameter,
a first positioning pin provided in contact with an outer peripheral surface of the bulging portion of the first sensor shaft,
a second positioning pin provided in contact with an outer peripheral surface of the bulging portion of the second sensor shaft,
a first spring member that presses the first sensor shaft toward the distal end with a first spring guide being disposed therebetween,
a second spring member provided adjacent to the first spring member to press the second sensor shaft toward the distal end with a second spring guide being disposed therebetween,
a first sensor body that contains the first sensor shaft, the first positioning pin, and the first spring member movably,
a second sensor body that contains the second sensor shaft, the second positioning pin, and the second spring member movably,
a first detector that detects a movement in an axial direction of the first spring guide, and
a second detector that detects a movement in an axial direction of the second spring guide,
wherein the first sensor body and the second sensor body are located at positions that are point-symmetrical with respect to a center point between the first electrode and the second electrode, and
wherein each of the first positioning pin and the second positioning pin is located at at least two positions that are point-symmetrical with respect to the center point between the first electrode and the second electrode.

2. A tandem welding torch comprising:
a torch fixing portion that fixes distal ends of two juxtaposed welding torches together;
an insulation cover that protects proximal ends of the welding torches;
a first torch proximal-end holding portion provided in the insulation cover to hold the proximal end of one of the welding torches;
a second torch proximal-end holding portion provided in the insulation cover to hold the proximal end of the other welding torch; and
a shock sensor unit that detects tilts and movements of the first torch proximal-end holding portion and the second torch proximal-end holding portion,
wherein the shock sensor unit includes
a hollow first sensor shaft in which a first electrode is inserted, the first sensor shaft having a front end connected to the first torch proximal-end holding portion and a rear end having a bulging portion of an increased diameter,
a hollow second sensor shaft in which a second electrode is inserted, the second sensor shaft extending in an axial direction of the first sensor shaft to be adjacent to the first sensor shaft and having a front end connected to the second torch proximal-end holding portion and a rear end having a bulging portion of an increased diameter,
a first positioning pin provided in contact with an outer peripheral surface of the bulging portion of the first sensor shaft,
a second positioning pin provided in contact with an outer peripheral surface of the bulging portion of the second sensor shaft,
a first spring member that presses the first sensor shaft toward the distal end with a first spring guide being disposed therebetween,
a second spring member provided adjacent to the first spring member to press the second sensor shaft toward the distal end with a second spring guide being disposed therebetween, a first sensor body that contains the first sensor shaft, the first positioning pin, and the first spring member movably,
a second sensor body that contains the second sensor shaft, the second positioning pin, and the second spring member movably,
a first detector that detects a movement in an axial direction of the first spring guide, and
a second detector that detects a movement in an axial direction of the second spring guide,
wherein the first sensor body and the second sensor body are located at positions that are point-symmetrical with respect to a center point between the first electrode and the second electrode, and
wherein each of the first positioning pin and the second positioning pin is located at at least two positions on a first concentric circle centered on the center point between the first electrode and the second electrode.

3. The tandem welding torch according to claim 1, wherein each of the first positioning pin and the second positioning pin is located at at least two positions on a second concentric circle having a radius different from that of the first concentric circle.

4. The tandem welding torch according to claim 1, wherein each of the first positioning pin and the second positioning pin is located at two positions in a direction perpendicular to a center line that connects a center point of the first electrode and a center point of the second electrode.

5. The tandem welding torch according to claim 1, wherein each of the first positioning pin and the second positioning pin is located at four positions in a direction of a center line that connects a center point of the first electrode and a center point of the second electrode and a direction orthogonal to the direction of the center line.

* * * * *